Oct. 31, 1933.   D. J. SWARTZ   1,932,609
DEMONSTRATION APPARATUS
Filed Oct. 29, 1932   2 Sheets-Sheet 1
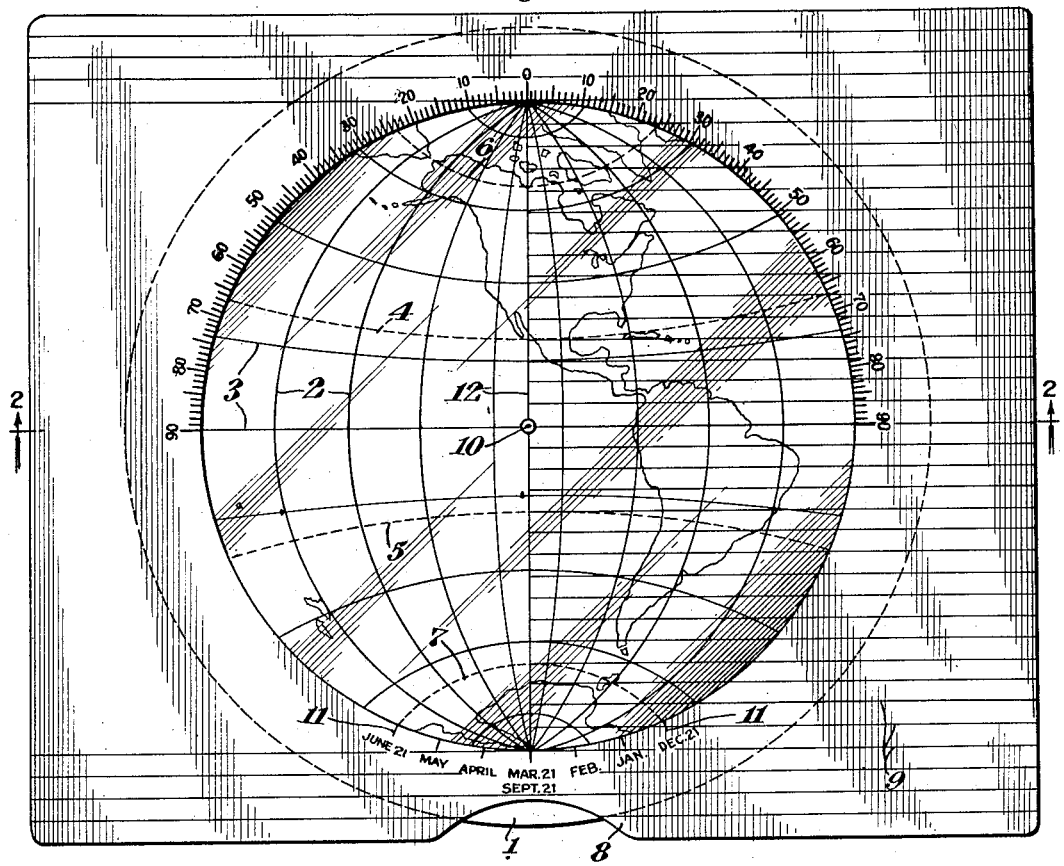
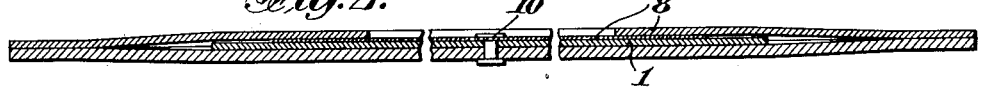
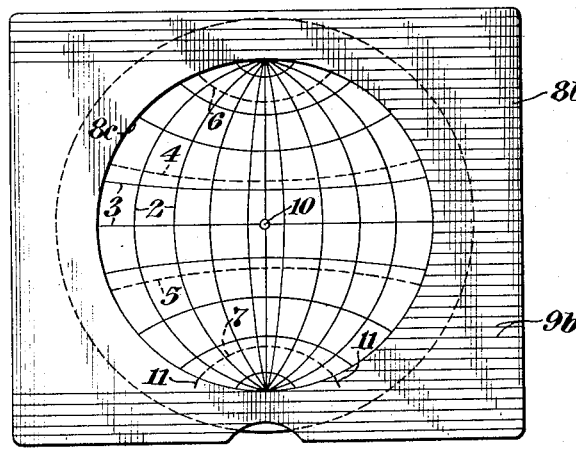
INVENTOR
David J. Swartz
BY
ATTORNEYS Oct. 31, 1933.                D. J. SWARTZ                1,932,609
                         DEMONSTRATION APPARATUS
                          Filed Oct. 29, 1932        2 Sheets-Sheet 2

INVENTOR
David J. Swartz
BY
ATTORNEYS

Patented Oct. 31, 1933

1,932,609

UNITED STATES PATENT OFFICE 1,932,609

DEMONSTRATION APPARATUS

David J. Swartz, New York, N. Y.

Application October 29, 1932. Serial No. 640,160

7 Claims. (Cl. 35—3)

The invention has for its main object to provide an apparatus adapted to demonstrate graphically, in flat form, various scientific facts of mathematical and physical geography and astronomy which involve the relationship between the earth and sun. The invention aims primarily to provide an apparatus of the above nature which will be simple and inexpensive in construction and otherwise well adapted for instruction purposes; further objects and advantages of the invention, however, will be in part obvious and in part specifically referred to in the specification hereinafter contained which, taken in conjunction with the accompanying drawings, discloses certain preferred embodiments thereof; such embodiments, however, are to be regarded as merely illustrative of the principles of the invention. In the drawings—

Fig. 1 is a plan view of one form of apparatus constructed in accordance with the invention;

Fig. 2 is a section on line 2—2 of Fig. 1;

Figure 3:
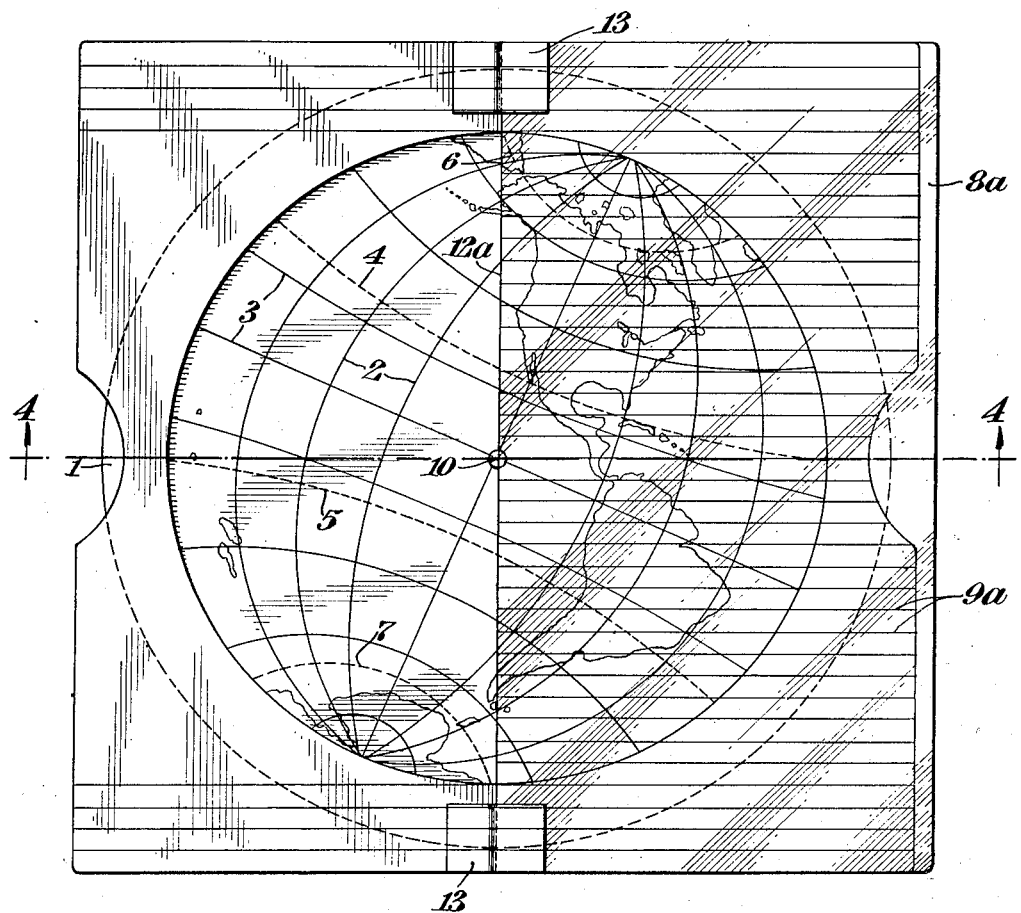
Figure 4:
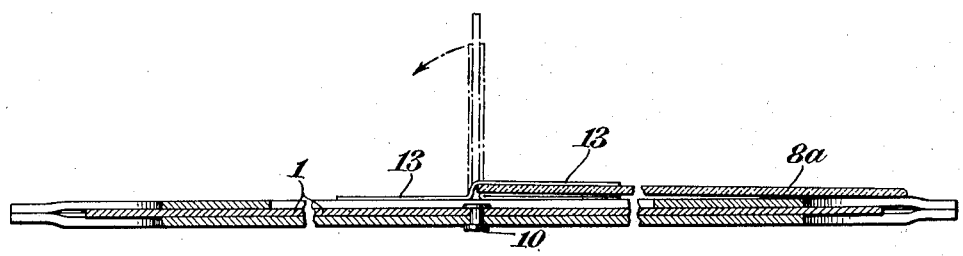

Figs. 3 and 4 are views similar to Figs. 1 and 2 respectively but showing an apparatus of somewhat modified construction, Fig. 4 being a section on line 4—4 of Fig. 2.

Fig. 5 is a somewhat diagrammatic view similar to Fig. 1 and showing a further modified form of construction.

Referring more particularly to Figs. 1 and 2, the invention is disclosed as applied to an apparatus wherein a sheet 1 bears a projection of a portion of the earth's surface, this projection being preferably of a type which more or less shows the spherical features of the earth. The sheet 1 for example as shown, bears a projection of the Western Hemisphere and includes longitudinal lines 2 and latitudinal lines 3 as well as lines 4 and 5 representing the Tropics of Cancer and Capricorn respectively and lines 6 and 7 which respectively denote the Arctic and Antarctic circles.

Superposed upon the sheet 1 is a second sheet or member 8 which bears a series of equally spaced parallel lines 9 which graphically represent the sun's rays as projected upon the portion of the earth's surface shown on sheet 1 and nearby areas, and said apparatus is constructed to show visibly, the relative positions of said parallel lines and the portion of the earth's surface which is depicted on the sheet 1. For example, as shown in Fig. 1, the sheet 8 may be formed in whole or in part, of suitable transparent material upon which the lines 9 are inscribed, or as shown in Fig. 5, the sheet 8b may be provided with an opening or window 8c through which the projection of the earth's surface is visible, and the lines 9b may terminate at the circle of the earth. In the form shown in Fig. 3, the lines 9a may be regarded as either inscribed upon a transparent sheet 8a, or as wires or threads located in a window-like opening similar to 8c above described.

The sheets 1 and 8 preferably are angularly movable with respect to each other, about an axis 10 which is located at the center of the earth as depicted on sheet 1, thereby making it possible to place the axis of the earth at any angle with the ecliptic and ocularly to demonstrate the angles between the sun's rays and the different portions of the earth in different seasons of the year. For example if the sheet 1 be turned about the axis 10 from the position shown in Fig. 1, to the position of the earth's axis marked 11 on Fig. 1, the apparatus will demonstrate conditions in the Northern and Southern Hemispheres which obtain on June 21st and December 21st of the year, and the Tropic of Cancer will be located by extending the line 4 from the point where the line 9 which passes through the center of the earth, intersects the circle representing the hemisphere of the earth. And likewise the Tropic of Capricorn may be located by swinging the sheet 1 to the alternate position 11, and inscribing the line 5 from the point where the above mentioned parallel line intersects the circle depicting the hemisphere of the earth. The positions of the Arctic and Antarctic Circles may be likewise determined by moving the sheet 1 to the position denoted at 11, and noting where the parallel lines 9 which are tangent to the Arctic and Antarctic portions of the earth's hemisphere, meet the circle of the earth in the above settings.

If desired the sheet 8 may be calibrated as indicated on Fig. 1 on or near the circle of the earth, to show readily different angles of inclination between the earth's axis and the ecliptic, and/or calibrations may be employed to show how the hemisphere should be placed to indicate the day and night conditions existing during the various months of the year, as indicated at the bottom of Fig. 1.

Preferably the parallel lines 9 terminate in a diametrical line 12 representing the circle of illumination (which latter may or may not be inscribed on sheet 8) which divides the earth in half, regardless of position as depicted on sheet 1, whereby the area of the earth covered by the lines 9, demonstrates the parts of the earth which are exposed to the sun in any particular setting; thus by noting the fraction of any of the latitudinal lines 3, which is covered by the lines 9, the relative lengths of night and day in any particular setting of the apparatus, and for any particular point of the earth shown on sheet 1, may be noted, and by observing the number of lines 9 which meet the circle of the earth between any two of the latitudinal lines 3, in any particular setting of the apparatus, the comparative conditions of warmth and cold will be indicated for any desired points shown on sheet 1. The above examples are to be considered merely as illustrative of many scientific facts which may be demonstrated by the use of the apparatus.

In the embodiment of the invention shown in Figs. 3 and 4, the sheet 8a which bears the parallel lines 9a, is mounted to swing about an axis 12a which corresponds to the diametrical line 12 above described. This may be accomplished in any suitable manner, for example, by providing flexible strips 13 which secure together the sheets 1a and 8a in what may be termed a hinged relationship. Thus, for example, when the earth is placed in the proper position for December 21st, sheet 8a can be swung so as to show the tilt of the earth's axis away from the sun, and when conditions for June 21st are to be considered, sheet 8a can be swung to the other side so that the earth's axis tilts towards the sun, all this being accomplished in this particular case, without changing the tilt of the earth's axis which in nature, always tilts more or less to one particular point in the heavens. This also brings out the fact that to a distant observer in the heavens the sun is located to the left (or right) of the earth in winter and in the opposite position in summer. This condition can also be attained by constructing the apparatus so that both sides are utilized. On one side the lines 9 are drawn on the left and the earth's axis tilts away from lines 9. On the other side lines 9 are to the right and the earth's axis tilts toward lines 9. Thus the first side may show conditions as of December 21st and the reverse side may show conditions as of June 21st, in both cases without utilizing the movable parts of the apparatus.

While certain particularly physical embodiments of the invention have been described, it should be understood that changes may be made therein without departing from its broader features, within the scope of the appended claims.

I claim:

1. A demonstration apparatus of the class described, having a sheet bearing a projection of a portion of the earth's surface, and a second sheet bearing a series of parallel lines, said sheets being superposed one over the other, and said apparatus being constructed to show visibly the relative positions of said parallel lines and the portion of the earth's surface which is depicted on the first mentioned sheet, said series of parallel lines overlapping a portion of the earth as projected on the first mentioned sheet and terminating at a diametrical line of the earth as so projected.

2. A demonstration apparatus of the class described, having a sheet bearing a projection of a portion of the earth's surface, and a second sheet bearing a series of parallel lines, said sheets being superposed one over the other, and said apparatus being constructed to show visibly the relative positions of said parallel lines and the portion of the earth's surface which is depicted on the first mentioned sheet, said series of parallel lines overlapping a portion of the earth as projected on the first mentioned sheet and terminating at a diametrical line of the earth as so projected, said sheets being relatively angularly movable about an axis which represents the center of the earth in respect to the projection borne by said first mentioned sheet.

3. A demonstration apparatus of the class described having an opaque sheet provided with a circular opening, a second sheet bearing a projection of a hemisphere of the earth, said second sheet being located behind said first sheet with said hemispherical projection substantially concentric with said opening and being mounted to turn angularly about an axis substantially concentric with the aforesaid circular opening, a transparent sheet secured to said first mentioned sheet and overlying said hemispherical projection, said transparent sheet bearing a series of parallel lines overlying said first sheet and terminating substantially at a diametrical line of said hemispherical projection so as to overlie substantially one half of the area of the latter in all angular adjustments of said second sheet.

4. A demonstration apparatus of the class described, having an opaque sheet bearing a projection of a hemisphere of the earth, a second sheet upon which said first mentioned sheet is mounted to turn angularly about an axis substantially concentric with said hemispherical projection, and means being provided whereby a series of parallel lines fixed in position with respect to said second mentioned sheet, are positioned above said hemispherical projection, said lines overlying substantially one half of the area of the latter and terminating substantially at a diametrical line of said hemispherical projection.

5. A demonstration apparatus of the class described, having a sheet bearing a projection of a hemisphere of the earth, a second sheet overlying said first mentioned sheet, said first mentioned sheet being mounted to turn angularly about an axis substantially concentric with said hemispherical projection, said second sheet having a circular opening substantially concentric with said hemispherical projection, and said second sheet bearing a series of parallel lines extending substantially to the edge of said circular opening.

6. A demonstration apparatus of the class described having an opaque sheet provided with a circular opening, a second sheet bearing a projection of a hemisphere of the earth, said second sheet being located behind said first sheet with said hemispherical projection substantially concentric with said opening and being mounted to turn angularly about an axis substantially concentric with the aforesaid circular opening, a transparent sheet secured to said first mentioned sheet and mounted to swing about an axis substantially coincident with a diametrical line on the aforesaid hemispherical projection, said transparent sheet bearing a series of parallel lines running substantially perpendicular to said diametrical line.

7. A demonstration apparatus of the class described, having a sheet bearing a projection of a hemisphere of the earth, a second sheet mounted to swing above said hemispherical projection about an axis substantially coincident with a diametrical line on the aforesaid hemispherical projection, said second mentioned sheet bearing a series of parallel lines running substantially perpendicular to said diametrical line and leaving exposed to view the portions of said hemispherical projection over which the lines are adapted to be superposed.

DAVID J. SWARTZ.